United States Patent [19]
Andrulionis

[11] 3,934,749
[45] Jan. 27, 1976

[54] PLASTIC CONTAINER

[75] Inventor: Algis Steven Andrulionis, Fairfield, Conn.

[73] Assignee: Polysar Plastics, Inc., Middletown, N.Y.

[22] Filed: Sept. 11, 1974

[21] Appl. No.: 504,884

[52] U.S. Cl. .................. 220/63 R; 220/9 F; 229/43
[51] Int. Cl.² ......................................... B65D 25/14
[58] Field of Search ............ 229/43; 220/9 F, 63 R, 220/256, 257, 258, 359, 63, 9

[56] References Cited
UNITED STATES PATENTS

| | | | |
|---|---|---|---|
| 3,625,785 | 12/1971 | Loberod et al. | 220/9 F X |
| 3,752,387 | 8/1973 | Arfert | 229/43 |

*Primary Examiner*—William T. Dixson, Jr.
*Assistant Examiner*—Steven M. Pollard
*Attorney, Agent, or Firm*—Stevens, Davis, Miller & Mosher

[57] ABSTRACT

A covered plastic container, and a method for the manufacture thereof, is provided in which a plastic laminate cover is sealed to the walls of the container in such a manner that only the inner layer of the laminate cover is sealed to the container and that the outer layer or layers of the laminate cover are removable therefrom and thereafter usable as a press-on cover.

9 Claims, 4 Drawing Figures

PLASTIC CONTAINER

This invention relates to lidded containers and more particularly to plastic containers as are used for food products and the like, the containers having fluid-tight sealing layers across the container opening and unitized with said sealing layer, but separable therefrom and replaceable thereover, a preformed press-on lid.

Many saleable products, and especially food products, need to be packaged in sealed containers in order to preserve the freshness of the product from the time of packaging until ultimate use by the consumer. It has also been found to be advantageous to frequently use containers having hermetic seals because the container is tamper proof and the product has an increased shelf life. The consumer may use the product in small portions over a period of time and the container thereby requires a replaceable cover having reasonable sealing properties to replace the seal which has been destroyed, partially or totally, in order to reach the contents of the container.

Many such containers, of various forms, are known. Tobacco and ground coffee is frequently packaged in a metal can having a hermetic seal at one end which is removed and subsequently replaced with a press-on lid or replaceable cover supplied with the can. Glass or plastic jars having wax paper hermetic seals and equipped with screw-on lids or replaceable covers are used for foodstuffs such as instant coffee and peanut butter. Adequate seals compatible with normal standards of hygiene are thereby obtained for use of the container and its contents subsequent to the rupture of the hermetic seal.

It is also known to use a plastic layer adhered to the rim of a container to provide a hermetic seal and, separately from this but operable over the membrane or in the absence of the membrane, a replaceable cover.

In all of these methods of closure the hermetic seal is manufactured and applied in one operation and the replaceable cover is separately manufactured and applied.

In the co-extrusion or lamination of plastic sheet materials, certain combinations of plastic layers in the laminate have strong, virtually inseparable bonds between the layers such that the individual layers cannot be readily separated. Other combinations of plastics as layers within a laminate possess only weak bonds between the layers and the layers may be readily separated, as by peeling. Such weak bonds have been attributed, by some, to electrostatic attraction between the layers.

It has now been discovered that a superior container having a hermetic seal comprises as the sealing member a laminate of at least two layers of different plastic material which are weakly bonded, one to the other, such that the outermost layer or layers may be readily removed to be subsequently used as a snap-on lid and the innermost layer is sealed to the container rim to form a hermetic seal which is broken only to reach the contents of the container.

It is an objective of this invention to provide an improved covered plastic container comprising a plastic body wall and plastic closed bottom end which, when filled with merchandise, has sealed to the upper end of the body wall a laminate cover comprising an inner plastic layer sealed to said upper end of the body wall and weakly adhered to the outer surface of said inner plastic layer at least one outer plastic layer which is separable from said inner layer, said at least one outer plastic layer being so shaped and formed as to act as a press-on lid for said container when separated from said inner plastic layer, said inner plastic layer and said at least one outer plastic layer being originally formed as a laminate cover.

It is a further objective of this invention to provide a method for the manufacture of a plastic container equipped with a plastic laminate cover wherein the inner layer of said plastic laminate cover is sealed to the upper end of the body wall of said container.

The accompanying drawings illustrate the sealed container embodied by this invention.

Figure 1:
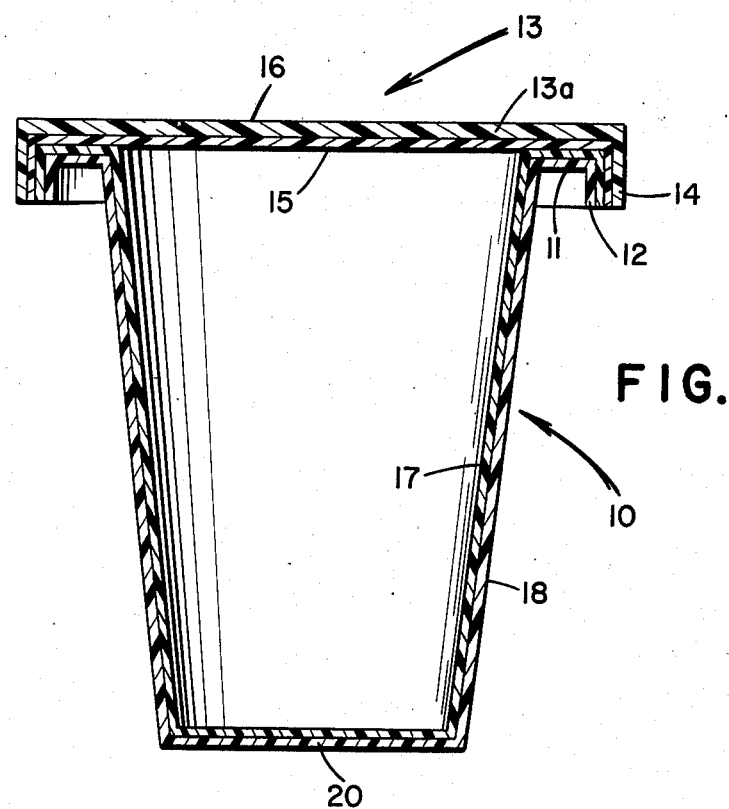
FIG. 1 is a cross-sectional view of a sealed container.

The container shown in FIG. 1 consists of a plastic body wall 10 and a plastic closed bottom end 20. The upper end of the body wall is formed into a rim having a plain horizontal flange 11 and a short dependent edge wall 12. The cover 13 for the container has a top flat portion 13a and a dependent edge wall 14, the interior radial dimension for the edge wall being such as to provide a tight fit to the outer dimension of the edge wall of the container. The body wall 10 of the container may be a single layer of plastic or may be a laminate of at least two strongly adhering layers, 17 and 18. The cover 13 will be a laminate of at least two layers 15 and 16 of plastic materials.

Figure 2:
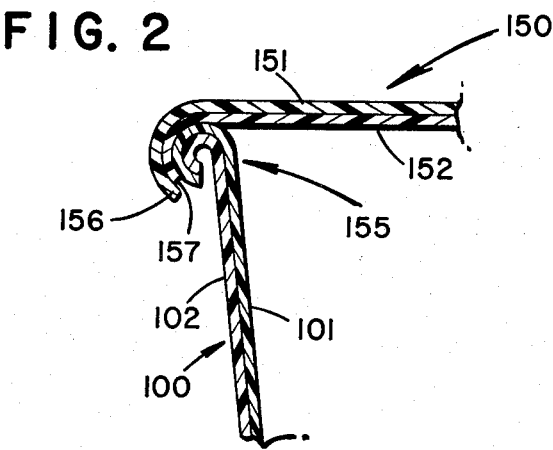
FIGS. 2, 3 and 4 are enlarged views of a container wall having attached thereto a lid.
Figure 3:
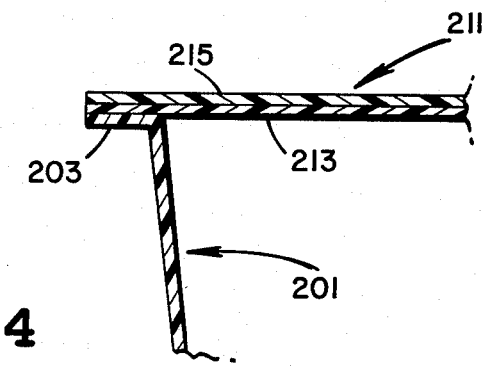
Figure 4:
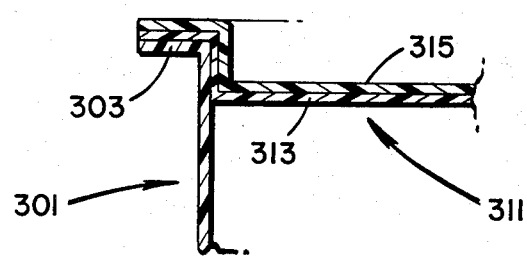

FIG. 2 shows an alternative form for the rim and cover for a container. The container body wall 100 is shown as a two-layer laminate, layer 101 being the interior layer and layer 102 being the outer layer. The container wall terminates at an outwardly, downwardly and inwardly curled lip 155. The lid 150 is shown as composed of a two-layer laminate, layer 151 being the outer layer and layer 152 the inner layer which is in contact with the inner layer of the container wall at the curled lip. The outer end of the lid terminates such that the inner layer finishes at 157 which is slightly inside the end of the outer layer 156, thereby forming a lip of the outer layer which may be easily grasped for purposes of removing the lid. FIG. 3 shows a container body wall 201 having a plain horizontal flange 203. The lid 211 is composed of a two-layer laminate, layer 215 being the outer layer and layer 213 being the inner layer in contact with the container wall at the horizontal flange. FIG. 4 shows a container body wall 301 terminating in a plain horizontal flange 303. The lid 311 is shown as fitting inside the top of the container wall and over the horizontal flange of the container wall. The lid comprises a two-layer laminate, layer 315 being the outer layer and layer 313 being the inner layer in contact with the container wall and flange. Many other variations are obvious to one of average skill in the art for the design of the upper end of the body wall and the lid, the drawings herein being illustrative only.

In the practice of this invention, suitable materials for manufacture of the container include, as single layers, polyethylene, polypropylene, polyvinyl chloride, acrylonitrile-butadiene-styrene (ABS) resins, polystyrene including high impact polystyrene and the acrylonitrile and methacrylonitrile barrier resins, and as laminates (with the outer layer recorded last) polyethylene — polystyrene, polyethylene — high impact polystyrene, polyethylene — ABS resin, polypropylene — polystyrene (including high impact polystyrene), polyvinyl chloride — polyethylene, polyvinyl chloride — polystyrene and high impact polystyrene — polystyrene. For the lid, which has to be an at least two-layer laiminate, suitable laminates (with the top exterior layer recorded last) include polyethylene — crystal polystyrene, polyethylene — high impact polystyrene, polyethylene — high impact polystyrene — crystal polystyrene, polypropylene — high impact polystyrene, polyvinyl chloride — polystyrene and high impact polystyrene — polystyrene. Other combinations of suitable plastics will be readily apparent to one of average skill in the art. The major considerations in selecting the materials for the manufacture of the container and the lid are that the product to be contained therein does not affect the material - thus, the container or the inner layer of a laminate for use as the container may be selected from polyethylene or polypropylene as for fats and certain fruit juices, impact polystyrene as for cottage cheese and ABS as for margarine and peanut butter. For carbonated beverages, a barrier resin would be required. The inner layer of the laminate used for the lid would be selected on a similar basis. The outer layer or layers of the lid and of the container, if a laminate is used therefor, would be selected for reasons of aging characteristics, aesthetic appeal, paintability, etc. In the lid, there may be a layer of a release agent, e.g., a silicone compound, between the inner plastic layer and the at least one outer plastic layer to facilitate separation of the at least one outer plastic layer from the inner plastic layer.

The containers are filled with the product to be packaged therein under conditions suitable for the particular product. The container lid is then fitted onto the top of the container by, for example, automated mechanical means and the filled container and lid are then subjected to a suitable sealing system so that the inner layer of the lid is sealed to the top of the container. Referring to FIG. 1, the inner surface 15 of the lid may be sealed to the inner layer of the container 17 at the point of contact along the horizontal flange 11 and optionally, at the edge wall 12, thereby providing a fairly large surface area of seal. Alternatively, the seal may be provided between the lid and only the edge wall. It is apparent from FIGS. 2, 3 and 4 that the inner surface of the lid may be sealed at a point of contact with the container wall as may be the most convenient and practical. The area of the seal may vary considerably as desired and may include only a portion of the contact area between the lid and the upper end of the container or it may include the whole such contact area. Such sealing may be achieved by any of the well known processes such as heat sealing, friction welding, ultrasonic welding, heat shrinking and adhesive sealing. For heat sealing, a heated or heatable element is brought into contact with the lid located on the container and sufficient heat applied to cause the inner layer of said lid to seal to the surface of the container. For friction or spin welding, the lid would be spun in a rotating motion and brought into contact with the container so that the fraction at the point of contact by the spinning of the top causes a melting and softening thereby forming a seal when the spinning is discontinued. For ultrasonic welding, the ultrasonic radiation is directed to the site to be so welded in the normal manner. The filled container now has a lid sealed to it. The lid may be readily removed in part by separation of the laminate at the weak bond between two layers. Thus, the lid applied to the container becomes two units. One unit, a single layer of a plastic, is sealed to the top of the container retaining the product within the container in a suitable condition. A second unit, being an at least one layer of a plastic, removed from the container, is a reusable press-on lid. The second unit, or press-on component, may be removed from the container, and thereby separated from the sealed layer, by any reasonable methods. The press-on component may be peeled off, with the hand, by means of a tab or lip or by separation of the two layers at the edge. This peeling may be facilitated by the presence of a release agent between the layers. The press-on component may be removed by a rotary motion — such removal might be facilitated by the application of a limited rotational motion after the factory sealing process. When the contents of the container are to be used, the sealed layer is punctured and may be cut or torn away to the desired extent and the contents become accessable. If a portion of the contents are to remain in the container, then the press-on portion of the lid is used to reseal the container in a conventional manner.

In selecting the plastic to be used as the inner layer of the lid, i.e., that layer to be sealed to the container, consideration may be given to whether or not it is desirable to visually inspect the contents of the container. Thus the contents of the container are not only tamper-proof but, if the sealing layer of the lid is essentially transparent, the quality of the contents may be visually inspected. The container and lid of the invention is thus a tamperproof container having a fluid-tight sealing layer across the container opening, has a replaceable lid for subsequuent use and, in a preferred embodiment, allows for visual inspection of the contents through the sealing layer. In selecting the plastic to be used in the layer of the laminate in contact with this inner layer, consideration may be given to the shipping, storage and use aspects for the container in order to establish the strength of the bond between the two layers and whether it is necessary to design the lid such that a lip is available for ready removal. The strength of the whole lid must be compatible with the strength of the container and must be such as to not limit the use of the container. It is obvious that the strength of the lid lies mainly with the removable portion of the laminate.

The outside of the wall of the container and the outer layer of the lid will be designed for aesthetic appeal including coloration, printing and decorative trim. The material may be essentially transparent or may be colored white or any other suitable color and the nature of the contents and the supplier thereof will normally be printed onto the surface.

Having now described and illustrated my invention, I claim as follows:

1. A covered plastic container comprising a body wall and closed bottom end and sealed to a rim of the upper end of the body wall a plastic laminate cover comprising an inner plastic layer sealed to said rim of said upper end of the body wall thereby forming a hermetic seal and weakly adhering to the outer surface of said inner plastic layer and at least one outer plastic layer which is separable from said inner layer, said at least one outer plastic layer being so shaped and formed as to act as a press-on lid for said container when separated from said inner plastic layer, said inner plastic layer and said at least one outer plastic layer being originally formed as a laminate cover.

2. The container of claim 1 wherein said body wall and said closed bottom end are a single layer of plastic selected from polyethylene, polypropylene, polystyrene, polyvinyl chloride and acrylonitrile-butadiene-styrene resin.

3. The container of claim 1 wherein said body wall and said closed bottom end are a laminate of two plastics selected from polyethylene-polystyrene, polyethylene-high impact polystyrene, polypropylene-polystyrene, polyvinyl chloride-polystyrene and high impact polystyrene-polystyrene.

4. The laminate cover of claim 1 in which the inner layer is selected from polyethylene, polypropylene, polyvinyl chloride and high impact polystyrene.

5. The laminate cover of claim 1 in which the at least one outer layer is selected from crystal polystyrene, high impact polystyrene and high impact polystyrene/crystal polystyrene.

6. A process for the manufacture of a plastic container equipped with a plastic laminate cover wherein the inner layer of said plastic laminate cover is sealed to a rim of the upper end of the body wall of said container by a sealing process selected from heat sealing, friction or spin welding, ultrasonic welding, heat shrinking and adhesive sealing, said plastic laminate cover comprising said inner layer sealed to a rim of said body wall thereby forming a hermetic seal and weakly adhering to said inner layer and at least one outer plastic layer which is separable from said inner layer.

7. The process of claim 6 wherein a heated or heatable element is contacted with said laminate cover and sufficient heat is applied to cause the inner layer of said laminate cover to seal to the upper end of the body wall of said container.

8. The process of claim 6 wherein said laminate cover is sealed to said body wall by friction or spin welding by causing said cover to be spun in a rotating motion while in contact with said body wall.

9. A covered plastic container comprising a body wall and closed bottom end and sealed to the upper end of the body wall a laminate cover comprising an inner plastic layer sealed to said upper end of the body wall and weakly adhering to the outer surface of said inner plastic layer an at least one outer plastic layer which is separable from said inner layer, said at least one outer plastic layer being so shaped and formed as to act as a press-on lid for said container when separated from said inner plastic layer, said inner plastic layer and said at least one outer plastic layer being originally formed as a laminate cover, and having a release agent provided between said inner layer and said at least one outer layer.

* * * * *

UNITED STATES PATENT OFFICE
CERTIFICATE OF CORRECTION

PATENT NO. : 3,934,749
DATED : January 27, 1976
INVENTOR(S) : Algis Steven ANDRULIONIS It is certified that error appears in the above-identified patent and that said Letters Patent are hereby corrected as shown below:

Claim 1, column 4, line 62, cancel "and" and insert -- an --.

Claim 6, column 6, line 1, cancel "and" and insert -- an --.

Signed and Sealed this eighteenth Day of May 1976

[SEAL]

Attest:

RUTH C. MASON
Attesting Officer

C. MARSHALL DANN
Commissioner of Patents and Trademarks